Figure 2:
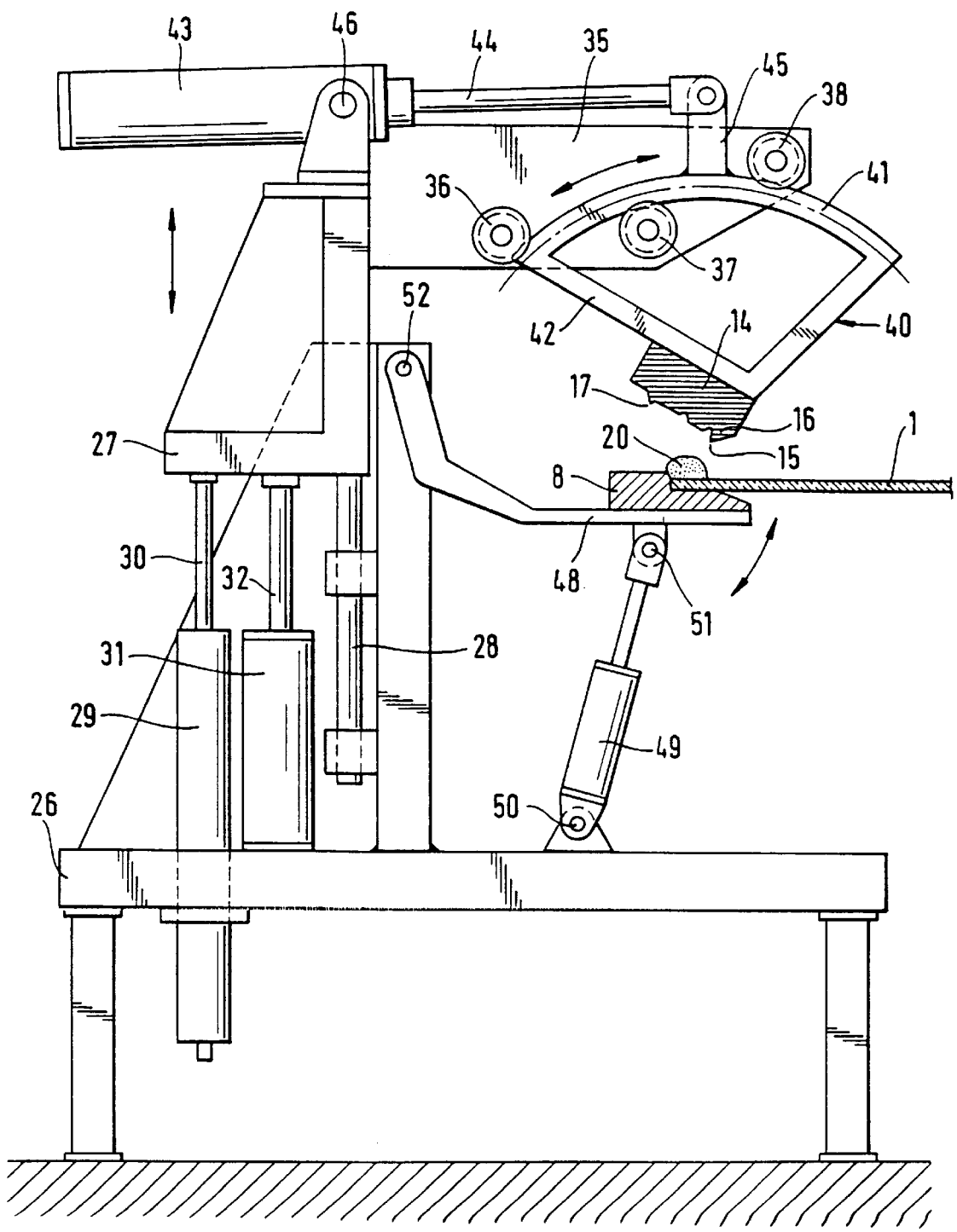

United States Patent [19]
Krumm et al.

[11] Patent Number: 6,039,907
[45] Date of Patent: Mar. 21, 2000

[54] METHOD FOR FINISHING AN EXTRUDED SEAL IN SITU ON A SHEET

[75] Inventors: Helmut Krumm, Aachen; Florenz Kittel, Wuerselen; Rolf Koette, Alsdorf; Ralf Motzheim, Stolberg, all of Germany

[73] Assignee: Saint Gobain Vitrage, Courbevoie, France

[21] Appl. No.: 08/849,459

[22] PCT Filed: Dec. 18, 1995

[86] PCT No.: PCT/FR95/01685

§ 371 Date: Sep. 11, 1997

§ 102(e) Date: Sep. 11, 1997

[87] PCT Pub. No.: WO96/19339

PCT Pub. Date: Jun. 27, 1996

[30] Foreign Application Priority Data

Dec. 19, 1994 [DE] Germany .............................. 44 45 258

[51] Int. Cl.[7] .................................................. B29C 37/00
[52] U.S. Cl. ..................... 264/161; 52/204.591; 264/163; 264/252; 264/259; 296/84.1; 296/90; 296/93; 425/127; 425/292; 425/298

[58] Field of Search ..................................... 264/161, 163, 264/252, 259, 310, 322; 425/127, 292, 298; 52/204.591; 296/84.1, 90, 93

[56] References Cited

U.S. PATENT DOCUMENTS

| | | | |
|---|---|---|---|
| 4,688,752 | 8/1987 | Barteck et al. | 425/127 |
| 5,302,333 | 4/1994 | Capriotti et al. | 264/177.19 |
| 5,599,416 | 2/1997 | Kuwahara | 264/322 |

Primary Examiner—Jan H. Silbaugh
Assistant Examiner—Dae Young Lee
Attorney, Agent, or Firm—Pennie & Edmonds LLP

[57] ABSTRACT

To postform the region of transition between the initial part and the end part of a section piece forming a closed frame and applied to window glass (1) by extrusion, use is made of a mould (14) which pivots about an axis parallel to the longitudinal axis of the extruded section piece and which is situated in the region of the surface of the window glass (1). The axis of pivoting of the mould (14) coincides with the cutting ridge (15) of a protrusion (16) which limits the calibrated cavity of the mould (14) on the internal face of the extruded section piece. As the mould (14) pivots, the excess polymer material is pushed back in the direction of the periphery of the window glass and beyond this periphery.

18 Claims, 2 Drawing Sheets

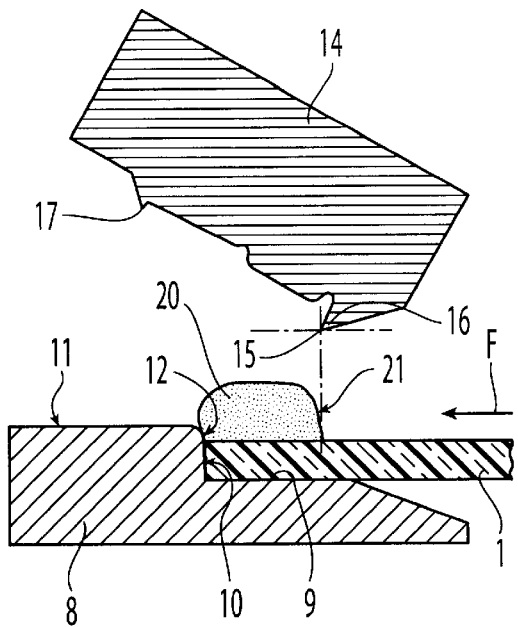
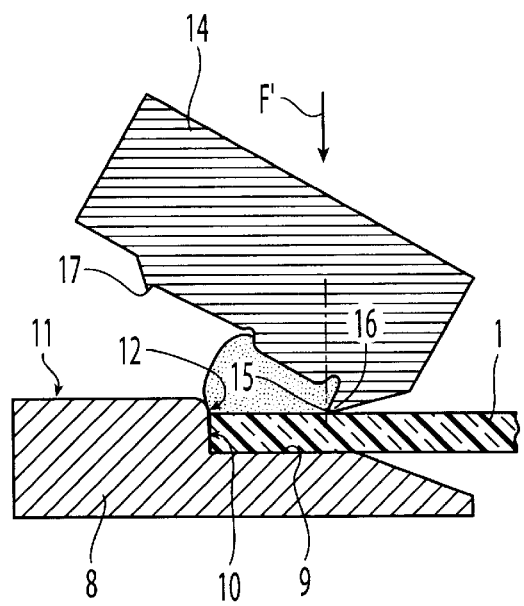
Fig. 1a　　　　　　　　Fig. 1b
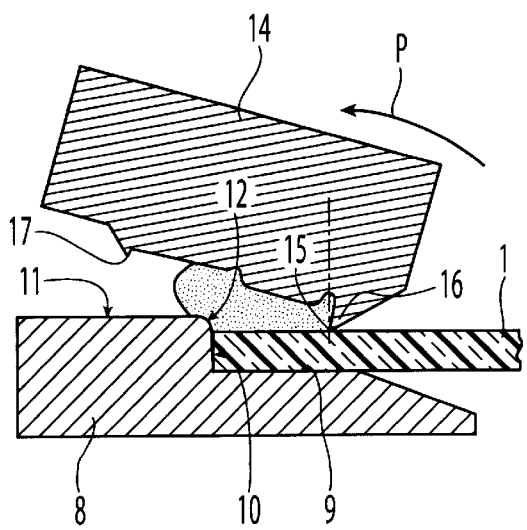
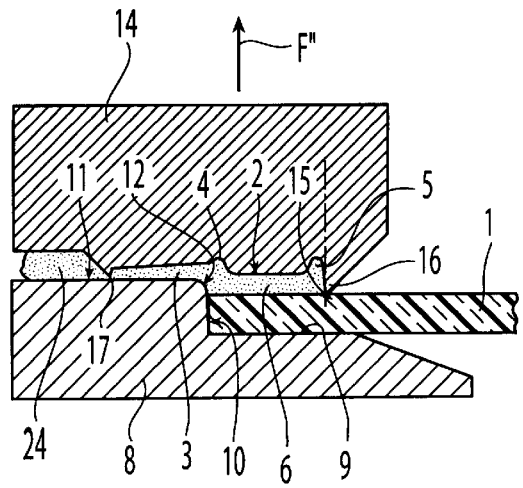
Fig. 1c　　　　　　　　Fig. 1d

METHOD FOR FINISHING AN EXTRUDED SEAL IN SITU ON A SHEET

The present invention relates to a method for postforming an extruded section piece consisting of a malleable material, especially a polymer, particularly in the region where a looped section piece connects to the peripheral part of an object. In this method, a mould, the cavity of which corresponds to the desired section of the section piece is lowered onto the latter by pivoting about an axis oriented parallel to the longitudinal axis of the said section piece. The invention furthermore relates to an appropriate device for the implementation of the method.

A method of this type, known and described in the document DE 9011573 U1 serves for the postforming of a profiled strip consisting of a reactive system based on polyurethane and extruded and applied to window glass. In this method, the mould is composed of a device equipped with two jaws which is guided in an open position from the outside over the peripheral part of the window glass, which part is equipped with the profiled strip. The axis of pivoting of the two jaws is located outside of the object. After the mould has been positioned, the surface of the window glass opposite the profiled strip is located in a recess of one of the jaws, the other jaw which imparts its shape to the strip tilts about the axis of pivoting and is pressed onto this strip.

In the region of the profiled strip to be postformed, there is normally an excess of polymer material which has to be removed during the postforming operation. To this end, the known device is equipped with a removal channel through which the material is pushed back towards the looked-through surface of the window glass. This excess material has to be taken off subsequently. As it sticks to the surface of the glass, subsequent removal of this material gives rise to difficulties.

The object of the present invention is to conceive a method of the previous type which makes it easier to remove the excess material which arises during postforming.

In order to solve the technical problem, the invention proposes a method for postforming a section piece extruded on the surface of an object in which method a mould exhibiting a cavity corresponding to the shape of the section piece is placed over the section piece in a rotation movement, in which the axis of rotation is situated in the immediate vicinity of the surface of the object. According to the invention, the axis of rotation is situated on the side of the section piece opposite to the edge of the object. For preference, the mould during its rotation gives rise to the material of the section piece being pushed towards the outside of the surface of the object.

Thus, in the method according to the invention, as in the prior art, the motion for closing the mould is a motion of rotation. However, as a result of the position of the axis of pivoting with respect to the surface of the object equipped with the profiled strip, the mould cavity and the surface of the object constitute a closed space. In this way, during the closure operation, that side of the section piece which is turned towards the central part of the object is limited by the mould first of all. As soon as the mould is applied against the surface of the object, it is no longer possible for any material constituting the section piece to escape on this side during the forming process. Rather, by continuing with the operation of closing the mould, material is pushed back in the direction of the outside. When the profiled strip is extruded and applied to the peripheral part of window glass, the excess mass is thus pressed and discharged beyond the lateral face of the window glass, where it can be taken away relatively simply. However, even in cases in which the profiled strip is not applied to the immediate periphery of the window glass, but is applied further towards the internal part of the latter, the removal of excess material from the surface of the said window glass situated on one side of the strip only can be performed more easily than if the excess material has to be removed from the surface of the window glass on both sides of the strip as in the prior art.

According to the invention, the axis of pivoting of the mould may be situated level with or above or below the surface of the window glass. However, components of the force which acts on the section piece are, in the latter two cases, exerted parallel to this surface which, as the case may be, may be prejudicial to the adherence of the material of the section piece to the window glass and/or have negative repercussions on the properties of this material. This is why the best results are obtained when the axis of pivoting is situated level with the surface of the window glass or slightly above it. In practice, use may be made of a mould which is equipped with a protrusion on the face of the calibrated cavity, which limits the profiled strip on its internal face. This protrusion, whose ridge consisting of its wedge-shaped faces, forms the axis of pivoting, is first of all lowered as far as the surface of the window glass or as far as its immediate proximity, before the pivoting motion of the mould is begun.

In fact, the foregoing description shows that before being placed on the section piece, the mould first of all undergoes a relative movement with respect to the surface of the object which positions it in an inclined manner, its ridge which corresponds to that limit of the section piece which is directed towards the inside of the surface of the window glass being practically in contact with the surface at the point intended to be that limit of the section piece which is directed towards the surface of the window glass and that next, its movement is a rotation about this ridge until the internal surface of the cavity occupies the intended position for the surface of the section piece.

The device for the implementation of the invention includes means for positioning and for fixing the window glass which guarantee precise location of the section piece to be postformed, as well as a first mould with a cavity, the shape of which corresponds to that to be given to the section piece, the shape of the mould being such that it ends on the inner side in relation to window glass in a ridge having a clearance towards the outside, the mould being capable of moving first of all substantially perpendicularly to the surface of the window glass, nearing it in an inclined manner until the said ridge comes practically into contact with the surface of the window glass at the site of the edge of the section piece on the inside, the mould being capable of turning with a circular motion about an axis parallel and close to the said ridge.

Further details and advantageous features of the invention will emerge from reading the claims and the description hereafter of one preferred embodiment of the device according to the invention, illustrated by the drawings in which:

FIGS. 1a–1d is a diagrammatic representation of the successive stages in the operation of postforming a profiled frame equipped with a lip for centering on a window glass, and FIG. 2 illustrates a lateral view of the device for the implementation of the method.

The method according to the invention will be described hereafter in the case of the pre-equipping of window glass, particularly window glass for cars, intended to be fitted by adhesive bonding. The profiled frame which is extruded and applied to car window glass may have the desired section. It may in particular have a part with a lip projecting around the perimeter of the window glass, and whose development is more or less parallel to the surface of the window glass. This part is used as a centering and supporting lip when the glass is being fitted in the frame of the window and makes it possible to obtain a constant distance between the border of the window glass and the opposite edge of the frame over its entire perimeter. Furthermore, the function of this lip is to fix the window glass in the opening of the window during the process of curing of the fitting adhesive, so that it is possible to dispense with any other means for positioning and fixing window glass while the adhesive is setting. The profiled frame may furthermore exhibit so-called shimming portions, that is to say portions of section piece which are orientated preferably perpendicular to the surface of the window glass and which serve to determine the depth at which the latter is fitted in the surround. Such shimming portions may at the same time serve as a limiting ridge for the mounting adhesive. Irrespective of the section of the profiled frame, it is in all cases desirable for the region of transition between the initial part and the end part of the extruded section piece which is closed up on itself to form a loop to be postformed. This postforming is absolutely indispensable in cases in which parts of the frame remain visible after the window glass has been fitted to the vehicles, this being particularly the case for the sealing and centering lips mentioned.

On principal, various polymer-based systems may be employed for extruding and applying profiled strips on objects insofar as the polymer material adheres sufficiently to the surface of the object and displays the desired characteristics of viscosity during the extrusion operation and, after the extrusion mass has cured, it displays the desired characteristics regarding its adherence, its strength with respect to mechanical agents, its resistance against chemical agents and the necessary elastic properties. For the envisaged use, water-curing one part polyurethane-based systems, as described for example in document U.S. Pat. No. 3,779,794; two-part polyurethane systems, as described in EP 0 083 797 and 0 024 501; and systems based on thermoplastic elastomer, as described in U.S. Pat. No. 5,336,349 have been used successfully. When the profiled strip is extruded from a reactive system, the postforming operation must of course be carried out immediately after the extrusion operation, before the extruded strip begins to cure as a result of the polymerization reaction. In contrast, when the section piece is extruded from a thermoplastic polymer, it is not necessary for the postforming operation to be carried out immediately following the extrusion, but it may be carried out at any subsequent time. In this case, all that is required is to ensure that the material resumes its state of plasticity by suitably reheating the mass to be postformed.

A necessary condition for being able to apply the techniques of the invention is that, in the region to be postformed, there should be an excess of material or, in a limiting case, precisely the desired amount. This will generally be the case in the region of connection between the beginning and the end of a section piece which constitutes a loop on the object on which it has been deposited, generally by extrusion (but the invention also applies to the other depositing techniques insofar as the material is still malleable at the time of postforming). The techniques of the invention are also applicable to scenarios in which the shape of a section piece is to be altered, either because it has a defect or alternatively because in the region in question it is desirable to have a shape other than that of the rest of the section piece.

As with known moulds, it is necessary to avoid any adherence between the surface of the mould and the mass of polymer to be postformed by selecting appropriate materials for the mould or by depositing an appropriate coating on its surface.

Appropriate non-stick deposits are known and are selected on the basis of the polymer used for the particular case in question.

The embodiment represented in FIG. 1 describes the operation of postforming a section piece 2 applied to the periphery of window glass 1, and which is equipped with a lip 3 projecting above the perimeter of the window glass. Moreover, in this case the section piece has a U-shaped section represented by the two ridges 4 and 5 which are more or less perpendicular to the surface of the window glass 1, and by its middle part 6.

To postform the extruded section piece in the envisaged case, a first, upper mould 14 and a second, lower mould 8 are required, which moulds should be correctly positioned with respect to each other and with respect to the section piece during the compression operation. The lower mould 8 has a support surface 9 for the window glass 1 and a contact surface 10 intended to take the edge of the window glass. The moulding surfaces 11 and 12 of the lower mould 8 have a configuration corresponding to the desired lower shape for the lip 3 of the extruded section piece.

The upper mould 14 is calibrated over the cavity of its lower face on the basis of the desired section for the section piece. In the closed position, the relative position of the upper mould 14 and of the lower mould 8 is determined by the cutting ridge 15 of the protrusion 16 on the one hand, and by a cutting ridge 17 which projects on the other hand. Whereas the cutting ridge 15 is practically in contact with the surface of the window glass 1, the cutting ridge 17 acts in contact with the surface 11 of the mould 8.

During the relative movement stage A, the two moulds 8 and 14 are first of all moved apart to allow the window glass to be inserted between them in the direction of the arrow F between these two elements, the window glass then comes into contact with the lower mould 8. The strip of malleable material 20 which has a rather irregular shape at this time, may already be partially postformed by the moulding surface 12 of the lower mould 8. The ridge 15 of the protrusion 16 of the upper mould 14 adopts a position which lies in a vertical plane which comprises the internal limit 21 of the extruded section piece 20.

As soon as the window glass 1 had been positioned between the moulds 8 and 14 according to the procedure described, stage B of the postforming operation may begin. During this second stage, the upper mould 14, which is inclined, moves parallel to itself in the direction of the arrow F' towards the lower mould 8, until the ridge 15 of the protrusion 16 comes practically into contact with the window glass 1. When the upper mould 14 adopts this position, its cavity forms, together with the surface of the window glass, that of the lower mould 8 and, at their two ends, the ridge 15, a space which is closed except on one side, so that it is no longer possible for the polymer material to escape towards the inside of the window glass. It may happen that the strip of polymer 20 spreads in the direction of the internal surface of the window glass 1 before the postforming operation, thus extending beyond the definitive section of the section piece. In this case, the protruding part of the strip is chopped off by the cutting ridge 15 as the upper mould 14 is lowered. This, however, is a relatively minimal piece of "flash" which lies in the immediate proximity to the post-formed section piece and may be removed without difficulty after the polymer has solidified.

In postforming stage C, the upper mould 14 pivots about the ridge 15 in the direction of rotation of the arrow P, the position of the said ridge 15 remaining unchanged. The malleable material thus remains trapped on the side limited by the ridge 15, and the excess mass of the section piece 20 is pushed back towards the outside, between the lower mould 8 and the upper mould 14 while the shape predefined by the cavity of the latter mould is simultaneously imparted to the section piece.

The tilting motion of the upper mould 15 drives the excess material which it pushes back, thereby creating that limit of the section piece which is directed towards the outside of the window glass. Finally, the cutting ridge 17 cuts this material before, at the end of its movement, coming into contact with the lower mould 8.

At the end of the pivoting motion, the upper mould has reached its final position in postforming stage D. In this position, the cutting ridge 17 is practically in contact with the moulding surface 11 of the lower mould 8 and thereby detaches the narrow strip 24 of excess material from the lip 3, the definitive limit of which is thus determined. The postforming operation is thus complete. The upper mould 14 is then raised again parallel to itself in the direction of the arrow F" and when it has reached its upper final position it is placed back in the angular position necessary for postforming stage A. The window glass 1 equipped with its postformed section piece is then taken out of the lower mould 8 and transferred to the next stage of manufacture.

A machine which provides for the implementation of the method is represented by FIG. 2 as far as its essential design features are concerned. Mounted on bearings on the bed 26 of the machine, and mobile in the vertical direction, is a support 27. The support 27 is guided by vertical guide rods 28 and rolling-contact bearing sleeves. A hydraulic brake 29, connected to the support 27 by the connecting rod 30, serves to damp the vertical motion. The latter is controlled by the pneumatic ram 31 which transmits the to-and-fro movement to the support 27 via the piston 32.

A fixture 35, on which three guide rollers 36, 37 and 38 are arranged, is fixed to the support 27. These three rollers serve to hold and to guide a frame 40, the segment 41 of which has the make-up of a segment of an arc of a circle. This segment of an arc of a circle 41 may thus pivot about the centre of the circle, which coincides with the ridge 15 of the upper mould 14. The latter is located below a part 42 of the pivoting frame 40. The tilting motion of the frame 40 is achieved by means of the hydraulic ram 43, the piston 44 of which is articulated with the lever 45, which is itself connected to the frame 40. In order to follow the gyratory motion of the frame 40, the hydraulic ram 43 is fixed to the frame 27 via a suitable bearing 46 so that it can pivot about the axis of the latter.

Furthermore, a table 48 bearing the lower mould 8 is connected to the bed 26 of the machine via a bearing 52 so that it can pivot about the latter. The pivoting motion of the table 48 is provided for by a pneumatic ram 49 which is fixed on the one hand to the bed 26 of the machine by a bearing 50, and on the other hand to the table 48 by the bearing 51.

To implement the postforming operation, the window glass 1 is deposited and positioned on the mould 8 together with the portion 20 to be postformed of the strip of extruded polymer applied to the window glass. By virtue of a machine control which is not represented in the drawing, the support 27 is lowered by pressurization of the ram 31 until the ridge 15 of the upper mould 14 comes practically into contact with the window glass 1.

Next, the control for pressurizing the ram 43 allows the upper mould 14 to perform its pivoting motion about the ridge 15. At the end of the postforming operation, the frame 27 is raised up by the pressurizing of the ram 31. When the frame 27 is at the upper end of its travel, the hydraulic ram 43 is actuated and the upper mould is thus returned to the inclined position. Next, actuating the ram 49 imparts to the table 48 and to the lower mould 8 an outwards and downwards tilting movement, moving the two elements mentioned away from the window glass 1. Thus the window glass 1 and the postformed extruded section piece 20 are moved away from the mould 8. The window glass 1 can then easily be taken out. Moreover, the moulds 8 and/or 14 may be equipped with heating or cooling devices by virtue of which, depending on the polymer material used, the solidifying process may be accelerated by cooling, or the reaction process may be accelerated by heating the polymer.

The foregoing detailed description shows that the condition for the implementation of the method is the creation of a space which is closed on two sides which meet (the surface of the object and/or of the lower mould, and the lower surface of the upper mould), these two assemblies being in contact along the ridge 15 about which their relative motion of rotation makes them pivot. The function of these device elements and of their motions is to bring about, on the material of the section piece during its forming, a movement with a perpendicular component and a parallel component, the latter one being directed towards the outside of the object. This is actually the only means of discharging the excess material towards the outside and preferably outside of the object.

We claim:

1. Method for postforming a region of a section piece of material extruded on the surface of an object having an outer edge which defines a periphery of the object, to form a profiled strip, the material of said section piece being malleable in said region, comprising the following steps:

placing over said region of said section piece a mould having a cavity corresponding to a desired shape of the post formed-profiled strip;

forming the malleable material in said region by closing the mould with a rotational movement wherein the axis of rotation is situated inside the periphery of the object and is adjoined closely to the surface of the object, so that the malleable material is urged towards the outer edge of the object.

2. Method according to claim 1 wherein the malleable material is thermoplastic and the forming step comprises reheating a region of the deposited material so that the malleable material becomes malleable again.

3. Postforming method according to claim 1, characterized in that a second, lower mould intended to support part of the section piece which extends beyond the object is put in place in the vicinity of the edge of the surface.

4. Postforming method according to claim 3, characterized in that the cutting ridge which cuts the malleable material of the section piece comes in contact with the second, lower mould at the end of the movement of the mould.

5. Method according to claim 1, wherein the malleable material is provided to the region of the profiled strip so as to connect a portion of the profiled strip with a second portion of the profiled strip.

6. Method according to claim 5, wherein the malleable material is formed so as to produce a protruding lip.

7. Method according to claim 6, further comprising curing the malleable material to form the region of the profiled strip.

8. Postforming a method according to claim 1, wherein the axis of rotation is located at a position intended to be the edge of the section piece which is closest to a center of the object.

9. Postforming method according to claim 8, characterized in that the rotation movement of the mould pushes back the mass of malleable material of the section piece towards the outer edge of the object.

10. Postforming method according to claim 8 which further comprises utilizing a second, lower mould to support part of the section piece which extends beyond the object at the edge of the surface.

11. Postforming method according to claim 8, wherein the mould includes a protrusion with a ridge around which the rotation is made.

12. Postforming method according to claim 11, wherein the mould includes a cutting ridge and which further comprises cutting the malleable material of the section piece with the cutting ridge of the mould as the malleable material is urged outwardly, thereby creating an outer edge of the section piece.

13. Postforming method according to claim 11, wherein the placing step includes moving the mould relative to the surface of the object to position the mould in an inclined manner, with the ridge being positioned adjacent to the surface of the object at the point intended to be the edge of the section piece which is closest to the center of the object located inside the periphery of and running across the object such that any material constituting the section piece cannot escape past the ridge and move outside the mould cavity, and also wherein the forming step includes rotating the mould about the ridge until the internal surface of the cavity is positioned such that the shape defined by the cavity of the mould is imparted to the surface of the section piece.

14. Postforming method according to claim 13, wherein the mould includes a cutting ridge and which further comprises cutting the malleable material of the section piece with the cutting ridge of the mould and while pushing back the malleable material, thereby creating that edge of the section piece which is directed towards the outer edge of the object.

15. A device for postforming into a profiled strip a region of a section piece of malleable material extruded at the surface of an object comprising:

means for positioning and for fixing the object (1) and locating the position of the section piece (20) to be postformed;

means for providing said region with a mass of malleable material;

means for placing over said region, including the mass of malleable material, a mould having a cavity corresponding to the desired shape of the post formed profiled strip, wherein the shape of the mould is such that the mould ends on the inner side in relation to the object in a ridge (15) having a clearance towards the outside, the mould (14) being capable of moving first of all substantially perpendicularly to the surface of the object, nearing the surface of the object in an inclined manner until the said ridge (15) comes practically in contact with the surface of the object (1) at the site of the edge of the section piece on the inside such that any material constituting the section piece cannot escape past the ridge; and means of forming the mass of malleable material by closing the mould with a rotation movement of the mould wherein, the axis of rotation is situated inside the periphery of the object and is adjoined closely to the surface of the object, so that the malleable material is pushed towards the outside of the edge of the object.

16. A device according to claim 15, characterized in that the mould (14) includes, at a limit of the cavity directed towards the outside of the object (1), a cutting ridge (17), the shape of which makes it possible to move the excess material towards the outside of the object.

17. A device according to claim 15, which further includes a second, lower mould (8) close to the edge of the surface of the object (1) and which supports part of the postformed section piece which extends beyond the object.

18. A device according to claim 15, characterized in that the mould is bourne by an element including a segment of an arc of a circle (41) guided by at least three rollers (36, 37, 38) two of which are on the same side, the circle and the rollers providing for the circular motion, while the movement perpendicular to the surface is performed by the support (27) for the segment of the arc of a circle (41).

* * * * *